US008728371B2

(12) United States Patent  
Maida et al.

(10) Patent No.: US 8,728,371 B2  
(45) Date of Patent: May 20, 2014

(54) METHOD OF PRODUCING STRETCHED FILM AND STRETCHED FILM

(75) Inventors: Norimasa Maida, Kudamatsu (JP); Yoshimi Itoh, Kudamatsu (JP); Toshiyuki Ueda, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 53 days.

(21) Appl. No.: 12/519,028

(22) PCT Filed: Dec. 7, 2007

(86) PCT No.: PCT/JP2007/073679  
§ 371 (c)(1), (2), (4) Date: Jun. 12, 2009

(87) PCT Pub. No.: WO2008/072567  
PCT Pub. Date: Jun. 19, 2008

(65) Prior Publication Data  
US 2010/0021738 A1 Jan. 28, 2010

(30) Foreign Application Priority Data  
Dec. 15, 2006 (JP) ................... 2006-338029

(51) Int. Cl.  
*D01D 5/16* (2006.01)

(52) U.S. Cl.  
USPC .............. 264/210.2; 264/173.16; 264/173.12; 264/291; 264/479; 264/173.15; 264/181; 264/209.5; 264/235.8; 264/288.4

(58) Field of Classification Search  
USPC ............ 264/173.16, 173.12, 210.2, 291, 479, 264/173.15, 181, 209.5, 235.8, 288.4  
See application file for complete search history.

(56) References Cited

U.S. PATENT DOCUMENTS 4,348,346 A * 9/1982 Thompson ................ 264/146  
5,716,570 A * 2/1998 Peiffer et al. ............. 264/146  
(Continued)

FOREIGN PATENT DOCUMENTS

DE 195 15 599 A1 11/1996  
JP 08-207119 A 8/1996  
(Continued)

OTHER PUBLICATIONS http://www.lasalle.edu/academ/chem/ms/polymersRus/Resources/GlassTrans.htm.*

(Continued)

*Primary Examiner* — Jeffrey Wollschlager  
*Assistant Examiner* — Stella Yi  
(74) *Attorney, Agent, or Firm* — Sughrue Mion, PLLC

(57) ABSTRACT

A method of producing a stretched film comprising melt-coextruding a thermoplastic resin A and a thermoplastic resin B to produce a composite film 1 having both-end films 2 of the thermoplastic resin B arranged in parallel at both end portions of the main film 1a of the thermoplastic resin A in the direction of width thereof, stretching the composite film, and cutting and removing both end portions of the stretched film in the direction of width, wherein a film stretch stress value of the both-end films 2 is larger than a film stretch stress value of the main film 1a at the same stretching ratio. This minimizes an increase in the thickness at both end portions of the film in stretching the film and decreases the widths by which both end portions of the expensive resin film are to be cut and removed for producing a film.

2 Claims, 3 Drawing Sheets

(56) References Cited

U.S. PATENT DOCUMENTS

| | | |
|---|---|---|
| 2002/0086963 A1* | 7/2002 | Higuchi et al. .............. 526/255 |
| 2006/0079389 A1* | 4/2006 | Hayashi ........................ 501/50 |
| 2008/0157424 A1 | 7/2008 | Fujii et al. |

FOREIGN PATENT DOCUMENTS

| | | | |
|---|---|---|---|
| JP | 08207119 | * | 8/1996 |
| JP | 10-315320 A | | 12/1998 |
| JP | 11-010723 A | | 1/1999 |
| JP | 2004-345216 A | | 12/2004 |
| JP | 2005-246607 A | | 9/2005 |

OTHER PUBLICATIONS

P.J. Rae, Sep. 15, 2004, The properties of poly(tetrafluoroethylene) (PTFE) in compression, p. 7615.*

* cited by examiner

METHOD OF PRODUCING STRETCHED FILM AND STRETCHED FILM

TECHNICAL FIELD

This invention relates to a method of producing a stretched film of a thermoplastic resin and a stretched film produced by the same production method. More specifically, the invention relates to a method of producing a stretched film having a thickness at both ends thereof that is little different from the thickness of the central portion of the film produced by melt-coextrusion, and to a stretched film produced by the same production method.

BACKGROUND ART

Plastic films have been widely used as packing materials, electronic materials such as for video tapes, and optical materials such as photo films. These plastic films are formed from a resin which is in a molten state or in a state of a solution. In many cases, these films are used as stretched films being stretched monoaxially or biaxially. A plastic is a high molecular material having a long molecular chain which is oriented upon being stretched. Therefore, a plastic film exhibits improved resistance against bending, bend recovering property, toughness, etc.

In recent years, plastic films have been widely used in the optical field such as of liquid crystal display devices, and it has been desired to further improve their properties. That is, to meet higher performances required for the films, the resin that becomes a material therefor has been produced having an ever complex molecular structure, such as being modified and blended, pushing up the cost. Further, in order for the film to exhibit its functions to a more than enough degree, it has been demanded not only that the film exhibits homogeneous properties but also that the film has a uniform thickness over the whole surface thereof.

As the films comprising a thermoplastic resin, there can be exemplified an unstretched film obtained by extruding a resin heated and melted in an extruder onto the surface of a casting roll through a slit of a T-die and winding it like a coil, a monoaxially stretched film obtained by extruding the resin onto the surface of the casting roll and stretching it in the lengthwise direction only, and a biaxially stretched film obtained by stretching the extruded resin in the lengthwise direction and in the direction of width. Any of these films ejected from the T-die and extruded onto the casting roll solidifies in such a manner that both end portions thereof become unavoidably thicker than the central portion thereof due to the properties of a highly viscous molten resin. Therefore, both end portions of the films are cut and removed to meet the allowable thickness in the direction of width that is required.

The yield of the resin material increases with a decrease in the width by which the film must be cut and removed at both end portions of the film where the thickness deviation is large. From the standpoint of producing the films, therefore, it is an important problem to decrease the width that must be removed.

For example, the following patent document 1 discloses a method of producing unstretched films comprising thermoplastic resins of many kinds in small amounts maintaining high yields. That is, in forming the unstretched film that is ejected from the T-die and is extruded onto the casting roll, there are coextruded only those portions that are solidified in such a manner that both end portions thereof become unavoidably thicker than the central portion due to the properties of the highly viscous molten resin, and those portions only are cut and removed.

As described above, while the stretched films are now exhibiting ever sophisticated functions, it has been demanded to further uniformalize the thickness profile of the films. In forming the unstretched film, a deviation in the thickness at both end portions of the film becomes a problem occurring in such relatively short periods of time as in a step where the resin falls from an ejection port of a T-die of an extruder onto the casting roll and a step where the resin solidifies on the surface of the casting roll. In the case of a stretched film, further, there remains a problem in that deformation due to stretching through a plurality of re-heating rolls and between the stretching rolls, greatly affects the deviation in the final thickness at both end portions.

The prior art information related to the present application is disclosed in the following document.
Patent document 1: JP-A-2005-246607

DISCLOSURE OF THE INVENTION

Problems that the Invention is to Solve

In forming the stretched film, therefore, the yield of the film cannot be maintained as expected relying only upon the technical idea of taking into consideration the portions where the thickness increases at both ends like the case of the unstretched film and by coextruding such portions together with an inexpensive resin. The present invention has an object of providing a method of producing a stretched film which is capable of decreasing the widths by which both end portions of an expensive resin film are to be cut and removed while minimizing an increase in the thickness at both end portions of the film caused by the deformation due to stretching that is accompanied chiefly by a shrinkage in the width even at the time of pre-heating by using rolls in a step where the film is stretched or at the time of stretching between the stretching rolls in a state where the temperature is maintained or heated.

Means for Solving the Problems

In producing a desired stretched main film comprising a thermoplastic resin A, it was discovered that deformation in the width and thickness of the film can be suppressed at the time of stretching if both-end films comprising another thermoplastic resin B having a film stretch stress value larger than that of the main film are arranged in parallel at both ends of the main film and if both ends of the main film are restricted at the time of stretching, and the present invention was thus achieved.

A method of producing a stretched film of the invention comprises melt-coextruding a thermoplastic resin A and a thermoplastic resin B to produce a composite film having both-end films of the thermoplastic resin B arranged in parallel at both end portions of the main film of the thermoplastic resin A in the direction of width thereof, stretching the composite film, and cutting and removing both end portions of the stretched film in the direction of width, wherein a film stretch stress value of the both-end films is larger than a film stretch stress value of the main film at the same stretching ratio.

In the method of producing a stretched film of the present invention, it is desired that:
1. The stretch stress value of the both-end films is 1.5 to 6.9 times as great as the stretch stress value of the main film at the same stretching ratio;

2. The width of the both-end films is not smaller than 5 mm on each side before being stretched; and
3. The stretching is a monoaxial stretching or a biaxial stretching.

According to the present invention, further, there is provided a stretched film produced by the above method of producing a stretched film.

Effects of the Invention

At both end portions of the main film of the thermoplastic resin A in the direction of width thereof from which the film is to be produced, both-end films of another thermoplastic resin B having a film stretch stress value larger than that of the main film are arranged, and the films are melt-coextruded. At the time of the next stretching, therefore, the tension (between the rolls) of the both-end films becomes larger than that of the main film. Therefore, the main film is placed in a state where both ends thereof are restricted, and the deformation due chiefly the shrinkage of width can be suppressed during the stretching. This suppresses an increase in the thickness of the portions of the main film where the width has shrunk, and helps increase a region where the thickness remains uniform in the direction of width of the main film. That is, the film needs be cut and removed by a decreased width in the portions other than the portion of the main film having an allowable thickness, making it possible to economically produce a desired stretched film of the thermoplastic resin A having a uniform thickness profile in the direction of thickness.

BEST MODE FOR CARRYING OUT THE INVENTION

Figure 1:
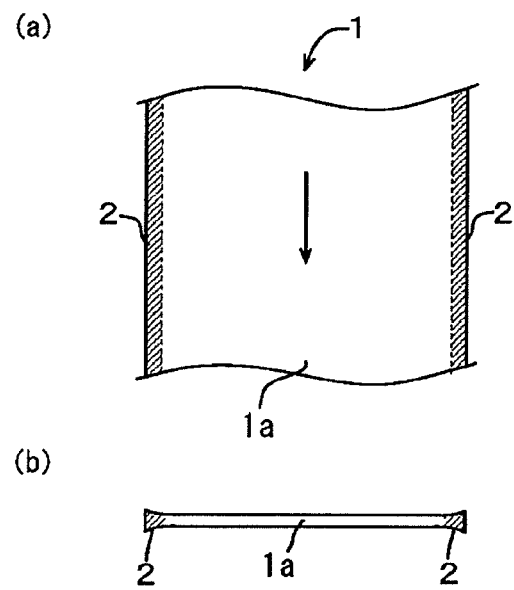
FIG. 1 shows an embodiment of the invention, wherein (a) is a plan view of a composite film comprising a main film and films at both end portions thereof, and (b) is a sectional view of the composite film comprising the main film and the films at both end portions thereof.

An embodiment of the invention will now be described in detail. FIG. 1(a) is a plan view of a composite film 1 after the step of producing the film by melt-coextrusion in a method of producing a stretched film according to the present invention. Along both end portions (hatched portions) of a main film 1a comprising a thermoplastic resin A from which the film is to be produced, there are arranged in parallel both-end films 2 comprising another thermoplastic resin B having a film stretch stress value larger than that of the main film 1a at the same stretching ratio. An arrow on the surface of the main film 1a in FIG. 1 indicates a direction of extrusion and ejection (lengthwise direction) at the time of producing the film.

The both-end films 2 are produced by melt-coextrusion simultaneously with the main film 1a and are arranged in parallel.

Here, the film stretch stress value is a stretch stress value (Pa) found by forming the thermoplastic resin into a film, cutting the film into a test piece, and measuring it by using a tensile tester. The both-end films 2 having the film stretch stress value larger than that of the main film 1a at the same stretching ratio stand for both-end films having a stretch stress value larger than that of the main film 1a as measured at the same stretching ratio as the main film. Prior to stretching both films after they have been melt-coextruded, the stretch stress values (Pa) of the respective films are separately found in advance by using a tester to select both-end films that are to be arranged along both ends of the main film in parallel.

FIG. 1(b) is a schematic sectional view of the composite film 1 in the direction of width/thickness. In producing a film by extruding a thermoplastic resin that is melted by heating, in general, the thickness gradually increases toward both end portions of the film due to a necking phenomenon (shrinkage of width) that unavoidably takes place. The deviation in the thickness at both end portions tends to decrease in the stretching operation that is conducted next, but still remains in the film even after it is stretched. In order to ensure deviation in the thickness that is allowable depending upon the use of the product films, the both-end films 2 and the main film 1a are partly cut and removed after the step of solidification by casting or after the step of stretching.

Figure 2:
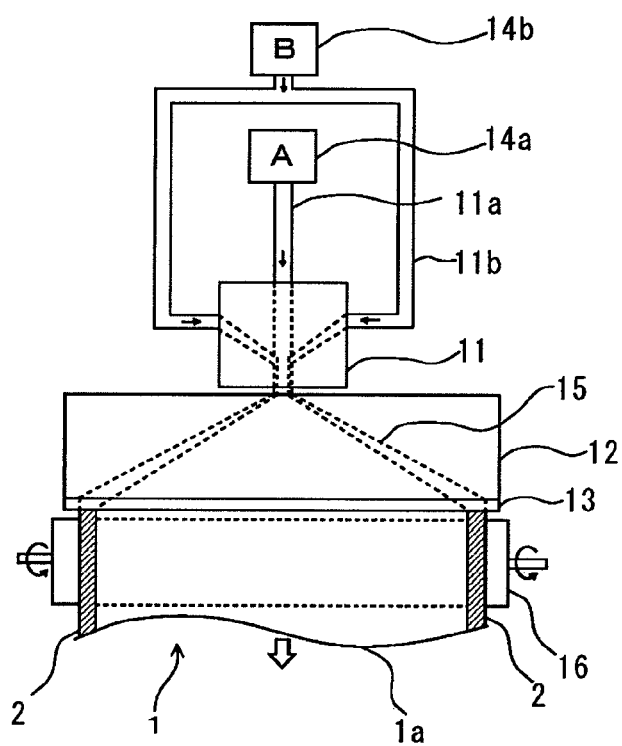
FIG. 2 shows the embodiment of the invention, and is a view schematically illustrating a step of production by melt-coextrusion.

FIG. 2 is a schematic view of an apparatus for producing the composite film 1 comprising the main film 1a of the thermoplastic resin A and the both-end films 2 of the thermoplastic resin B arranged in parallel along both end portions of the main film 1a and having a stretch stress value larger than that of the main film at the same stretching ratio by melt-coextruding the thermoplastic resin A and the thermoplastic resin B.

The thermoplastic resin A which is a material for the main film is heated and melted by an extruder 14a, and is fed into a feed block 11 through a feed pipe 11a. Another thermoplastic resin B that is to be coextruded onto both end portions of the thermoplastic resin A is heated and melted by an extruder 14b, and is fed to both sides of the feed block 11 through a feed pipe 11b that is connected to the extruder 14b and is branched on the way thereof. Next, the resins are coextruded in a state where the thermoplastic resin B is arranged in parallel along both end portions of the thermoplastic resin A in the feed block 11, into a T-die 12 connected to the lowermost portion.

In the T-die 12, the molten resins are spread through a manifold 15 provided therein and are ejected from a die lip 13 onto the upper circumferential surface of a casting roll 16 arranged at a lower portion. Solidification takes place on the surface of the casting roll, and there is formed the composite film 1 that is constituted by two films, i.e., the main film 1a of the thermoplastic resin A and the both-end films 2 of the thermoplastic resin B, and is continuous in the lengthwise direction.

Figure 3:
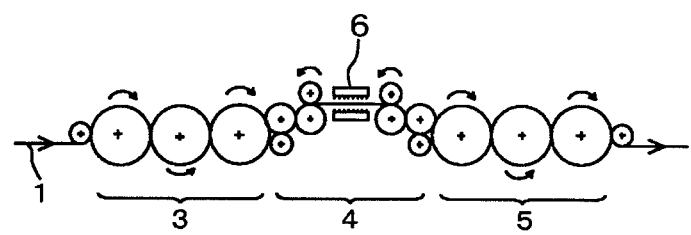
FIG. 3 is a view schematically illustrating a step of monoaxially (longitudinally) stretching the composite film to which the embodiment of the invention is applied.

Next, described below with reference to FIG. 3 is a step of monoaxially stretching the film in the method of producing a stretched film according to the invention. The composite film 1 comprising the main film 1a and the both-end films 2 formed by using the film-producing apparatus shown in FIG. 2, is stretched by about 1.5 to about 5 times in the lengthwise direction of the film through a stretching step which comprises, as shown in FIG. 3, a group of pre-heating rolls 3, a group of stretching rolls 4, a group of cooling rolls 5 and a heat-retaining heater 6. When the composite film 1 after cooled is to be used as a monoaxially stretched product film, unallowable thick portions at both end portions of the composite film 1 are cut and removed through a subsequent cutting step (not shown).

Referring to FIG. 3, the films at both ends are heated by the group of pre-heating rolls 3 to a temperature close to its glass transition temperature and are, further, guided to between a set of stretching rolls heated at a temperature higher by 10 to 20° C. than the glass transition temperature to thereby stretch the film relying upon a difference in the rotational speed between these rolls. Here, the heat-retaining heater 6 (infrared ray heater) is installed between the stretching rolls as shown in FIG. 3 to retain heat so that the film has a further uniformalized thickness in the direction of width and is stretched at an increased ratio. If the rolls are unnecessarily heated, tackiness occurs between the film and the rolls. If the temperature is too low, there occur such problems as wrinkles, distortion and breakage of the film.

In the foregoing was described a step of monoaxially (longitudinally) stretching the composite film 1 in the lengthwise direction. Described below next is a step of obtaining a biaxially stretched film by adding a transverse stretching in the direction of width of the film.

Figure 4:
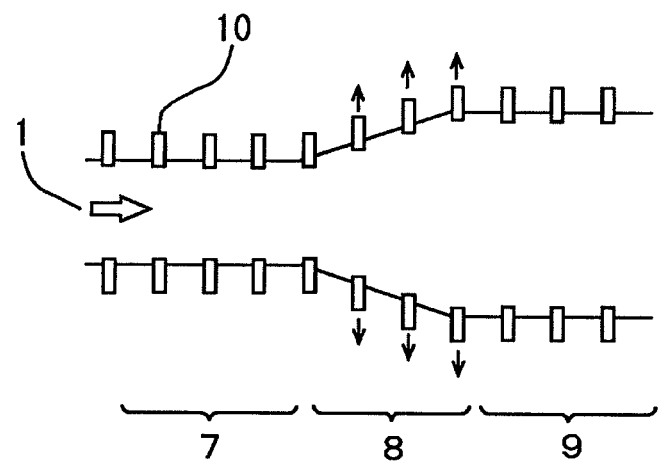
FIG. 4 is a view schematically illustrating a step of transversely stretching the composite film to which the embodiment of the invention is applied.

FIG. 4 is a view schematically illustrating a step of transverse stretching in the method of producing a stretched film according to the present invention. The monoaxially stretched composite film illustrated in FIG. 3 is held at its both end portions by a plurality of clips 10 and, in this state, is passed through a pre-heating zone 7, a transversely stretching zone 8 and a heat-setting zone 9, and is guided to a subsequent step of cutting and removing the films at both end portions. The films at both end portions held by the clips 10 are conspicuously deformed by the clips. Therefore, these portions are cut and removed together with the portions of the film having an increased thickness to thereby obtain a film that is stretched as desired.

According to the method of producing a stretched film of the invention, the above-mentioned step of producing the composite film (FIG. 2), step of monoaxial (longitudinal) stretching (FIG. 3), step of transverse stretching (FIG. 4) and step of cutting the end portions (not shown) can be constituted and arranged as a series of equipment.

In the foregoing were described the apparatus for melt-coextruding the thermoplastic resins in putting into practice the method of producing a stretched film of the invention, and the step of stretching. Next, described below are the thermoplastic resins used for the main film and for the both-end films arranged in parallel along both end portions thereof.

The following resins can be exemplified for preparing the main film and the both-end films that can be used for the method of producing a stretched film of the invention.

(1) Polymers or copolymers of a 1-alkene having 2 to 8 carbon atoms, such as low-density polyethylene, intermediate-density polyethylene, high-density polyethylene, polypropylene, ethylene/propylene copolymer, ethylene/butene-1 copolymer, ethylene/hexene copolymer, polymethyl methacrylate, polystyrene, acrylonitrile/styrene copolymer (AS resin), acrylonitrile/butadiene/styrene copolymer (ABS resin), and polyolefine resin comprising one or two or more kinds of copolymers thereof.

(2) Polyamide resins, such as 6-nylon, 6,6-nylon and 6-10 nylon.

(3) Polyester resins comprising one or two or more kinds of acids, e.g., dibasic aromatic dicarboxylic acids such as terephthalic acid, isophthalic acid, orthophthalic acid, p-β-oxyethoxybenzoic acid, naphthalene-2,6-dicarboxylic acid, diphenoxyethane-4,4-dicarboxylic acid and 5-sodiumsulfoisophthalic acid;

alicyclic dicarboxylic acids such as hexahydroterephthalic acid and cyclohexanedicarboxylic acid;

aliphatic dicarboxylic acids such as adipic acid, sebacic acid and dimeric acid; or polybacic acids such as trimellitic acid and pyromellitic acid; and one or two or more kinds of alcohols, e.g., diols such as ethylene glycol, propylene glycol, 1,4-butanediol, neopentyl glycol, 1,6-hexylene glycol, diethylene glycol, triethylene glycol and cyclohexane dimethanol; or polyhydric alcohols such as pentaerythritol, glycelol, and trimethylolpropane.

(4) Polycarbonate resins derived from bicyclic divalent phenols such as 1,1-bis(4-oxyphenyl)isobutane or 2,2-bis(4-oxyphenyl)propane and phosgenes.

(5) Polyarylate resins derived from bicyclic divalent phenols such as 1,1-bis(4-oxyphenyl)isobutane and aromatic dicarboxylic acids such as terephthalic acid and isophthalic acid.

In the invention, the films to be arranged in parallel along both end portions of the main film are those films having a high stretch stress value. Thermoplastic resins as well as resin films are softened as the temperature rises. Generally, therefore, the films having higher glass transition temperatures maintain higher stretch stress values even at high temperatures. Therefore, the films at both end portions are, in many cases, formed of a resin having a glass transition temperature higher than that of the main film. Further, a resin having a branched structure in which molecular chains are branched and a resin having a high molecular weight permit the molecular chains to be tangled. Therefore, films of these resins possess high stretch stress values. Accordingly, these resins, too, can be preferably used for forming films at both end portions.

In stretching the film by arranging the both-end films along both ends of the main film, the stretch stress value of the both-end films is set to be 1.5 to 6.9 times and, more desirably, 2 to 5 times as great as the stretch stress value of the main film. If the stretch stress value of the both-end films is smaller than 1.5 times that of the main film, a small effect is obtained for decreasing the deviation in the thickness at both end portions of the main film in the direction of width. If it exceeds 6.9 times, on the other hand, a difference in the tensile force between the main film and the both-end films becomes too great between the stretching rolls easily developing wrinkles, linear breakage due to deviation in the boundary portions and meandering (phenomenon in that the stretched film does not linearly travel along the central portions of the carrier rolls). In general, the stretch stress value of the thermoplastic resin film decreases with an increase in the temperature. At the time of stretching, the temperature of the both-end films only may be locally elevated to control the stretch stress value of the both-end films.

The both-end films having a large stretch stress value arranged in parallel along both end portions of the main film have a film width of not smaller than 5 mm on each side prior to being stretched. If the films arranged in parallel at both ends of the main film have a width of smaller than 5 mm, a small effect is obtained for decreasing the deviation of the thickness at both end portions of the main film relative to the central portion thereof. That is, the effect is small for increasing a portion of the main film where the thickness is uniform in the direction of width. If the width of the both-end films is selected to be not smaller than 5 mm on each side, the thickness of the main film can be more uniformalized. However, unnecessarily increasing the width of the both-end films results in a decrease in the width of the main film in the device for stretching the film where there is an upper limit on the stretchable width and, further, results in an increase in the excess film portions that are to be cut off at a subsequent step, pushing up the cost of production. Therefore, the width of the both-end films may be suitably set for a desired allowable deviation value of the main film but maintaining the width of not smaller than 5 mm by taking into consideration an increase in the cost of the both-end films. Generally, the width of the both-end films is practically not larger than 50 mm on each side.

EXAMPLES

The invention will now be described more concretely by way of Examples. There were provided three kinds of the thermoplastic resins for preparing the main film, i.e., three kinds of the thermoplastic resins A for preparing the main film and six kinds of the resins B for preparing the both-end films.

To use the both-end films having various stretch stress values in combination with the main film in the Example, the thermoplastic resins which are the materials of the main films and the both-end films were each heated and melted, extruded through a T-die to prepare films having a desired thickness of 100 μm. The films were cut into rectangular test pieces of a predetermined size (width: 80 mm, length: 90 mm), and were measured for their stretch stress values at desired stretching ratios and stretching temperatures.

The stretch stress values were measured by using a tension tester (RTA-500 manufactured by Orientech Co.). Namely, the rectangular test piece was so set that the distance between the grip fittings was 50 mm, subjected to the tension test in an oven maintained at a predetermined temperature at a tension speed of 500 mm/min., to find a change (stress-strain curve) in the load (stress) relative to the stretch (strain) of the test piece.

From the thus obtained stress-strain curve, stress at a predetermined stretching ratio was found and was regarded to be a stretch stress value. Tables 1 and 2 show stretch stress values of the films of when the main films and the both-end films were measured alone. The intrinsic viscosity IV values in Table 2 were measured in compliance with the JIS K 7367-1 (method of measuring viscosity of a polymer diluted solution by using a plastic-capillary tube type viscometer).

TABLE 1

| Resin for main film | Stretch stress value (MPa) | Remarks |
| --- | --- | --- |
| Acrylic resin | | |
| Stretch temp., 150° C. Stretch ratio, 2 times | 1.7 | copolymerized polymethyl methacrylate resin and acrylonitryl/styrene copolymer resin, which are melted and kneaded |
| Polymethyl methacrylate resin | | |
| Stretch temp., 150° C. Stretch ratio, 2 times | 1.3 | abbreviated as PMMA |

TABLE 1-continued

| Resin for main film | Stretch stress value (MPa) | Remarks |
| --- | --- | --- |
| polyethlene terephthalate resin | | |
| Stretch temp., 90° C. Stretch ratio, 3 times | 2.1 | abbreviated as PET |

TABLE 2

| Resin for both-end films | stress value (MPa) | Remarks |
| --- | --- | --- |
| Polyethylene naphthalate resin | | |
| Stretch temp., 150° C. | 1.8 | abbreviated as PEN (lowly viscous) *intrinsic viscosity IV value = 0.65 |
| Stretch ratio, 2 times | 1.9 | abbreviated as PEN (highly viscous) *intrinsic viscosity IV value = 0.75 |
| Polyarylate type alloy resin | | |
| Stretch temp., 150° C. Stretch ratio, 2 times | 2.6 | abbreviated as polyarylate A *manufactured by Unitika Co. (product grade: U-8000) |
| Polyarylate resin | | |
| Stretch temp., 150° C. Stretch ratio, 2 times | 18 | abbreviated as polyarylate *manufactured by Unitika Co. (product grade: U-100) |
| Blended resin of polycarbonate-ABS | | |
| Stretch temp., 150° C. Stretch ratio, 2 times | 5.4 | abbreviated as PC + ABS *manufactured by Teijin Kasei Co. (product grade: T-3714) |
| Polycarbonate resin Stretch temp., | | |
| 150° C. | 9.0 | abbreviated as PC |
| 160° C. Stretch ratio, 2 times ABS resin | 8.0 | |
| Stretch temp. 90° C. Stretch ratio, 3 times | 8.2 | abbreviated as ABS |

Figure 5:
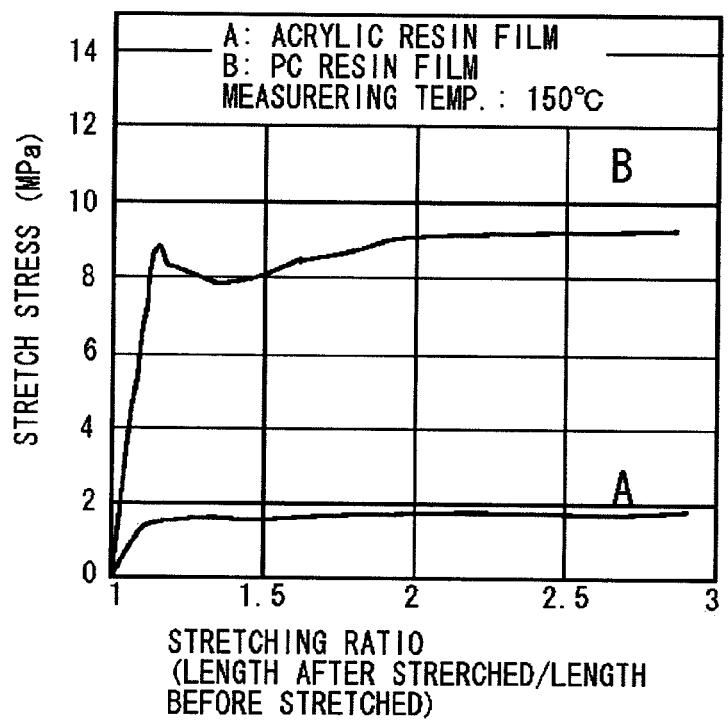
FIG. 5 is a graph showing stretching ratio—stretch stress lines of the main film and the films at both ends thereof in the embodiment of the invention.

FIG. 5 is a diagram of stretching ratio—stretch stress lines of the main film A (acrylic resin) and the both-end films B (PC resin) at 150° C. If the two are compared at a stretching ratio of 2 times (film thickness of 50 μm), the acrylic resin film has a stretch stress value of 1.7 MPa while the polycarbonate resin has 9.0 MPa. That is, the ratio of the stretch stress value (T) of the main film and the stretch stress value (t) of the both-end films is 5.3 (t/T).

The thermoplastic resins for the main film shown in Table 1 and the thermoplastic resins for the both-end films shown in Table 2 were heated, melted and coextruded as described above with reference to FIG. 2, and were stretched into 2 times (partly 3 times) in the film lengthwise direction by using the device for stretching film shown in FIG. 3 to obtain films having a thickness of 50 μm at the central portion of the films after stretched (some samples having a thickness of 200 μm were stretched into 2 times so as to possess a thickness of 100 μm). Thereafter, the both-end films were cut and removed to leave the main films only.

TABLE 3

| Sample symbol | Main film Resin | Stretch stress value T/ stretch ratio | Both-end films Resin | Stretch stress value t | Width of each side mm | Stretch stress ratio t/T |
|---|---|---|---|---|---|---|
| A-0 | acryl stretch temp., 150° C. | 1.7/2 times | none | — | 0 | |
| AP-1 | acryl stretch temp., 150° C. | 1.7/2 times | PEN (lowly viscous) | 1.8 | 25 | 1.06 |
| AP-2 | acryl stretch temp., 150° C. | 1.7/2 times | PEN (highly viscous) | 1.9 | 25 | 1.1 |
| AP-3 | acryl stretch temp., 150° C. | 1.7/2 times | polyarylate A (polymer alloy) | 2.6 | 25 | 1.5 |
| AP-4 | acryl stretch temp., 150° C. | 1.7/2 times | PC + ABS(*1) | 5.4 | 5 | 3.2 |
| AP-5 | acryl stretch temp., 150° C. | 1.7/2 times | PC + ABS(*1) | 5.4 | 20 | 3.2 |
| AP-6 | acryl stretch temp., 150° C. | 1.7/2 times | PC | 8.0(*2) | 5 | 4.7 |
| AP-7 | acryl stretch temp., 150° C. | 1.7/2 times | PC | 8.0(*2) | 10 | 4.7 |
| AP-8 | acryl stretch temp., 150° C. | 1.7/2 times | PC | 8.0(*2) | 25 | 4.7 |

| Sample symbol | Evaluation Thickness deviation at ends of main | Determined to be | Remarks Ex. or Comp. Ex. |
|---|---|---|---|
| A-0 | 15 | X | Comp. Ex. |
| AP-1 | 12 | X | Comp. Ex. |
| AP-2 | 10 | X | Comp. Ex. |
| AP-3 | 6 | ◯ | Example |
| AP-4 | 7 | ◯ | Example |
| AP-5 | 5 | ◉ | Example |
| AP-6 | 7 | ◯ | Example |
| AP-7 | 6 | ◯ | Example |
| AP-8 | 4 | ◉ | Example |

| Sample symbol | Main film Resin | Stretch stress value T/ stretch ratio | Both-end films Resin | Stretch stress value t | Width of each side mm | Stretch stress ratio t/T |
|---|---|---|---|---|---|---|
| AP-9 | acryl stretch temp., 150° C. | 1.7/2 times | PC | 8.0(*2) | 25 | 4.7 |
| AP-10 | acryl stretch temp., 150° C. | 1.7/2 times | PC | 8.0(*2) | 50 | 4.7 |
| AP-11 | acryl stretch temp., 150° C. | 1.7/2 times | PC | 9.0 | 25 | 5.3 |
| AP-12 | acryl stretch temp., 150° C. | 1.7/2 times | polyarylate | 18 | 25 | 10.6 |
| PP-1 | PMMA stretch temp., 150° C. | 1.3/2 times | PC | 9.0 | 25 | 6.9 |
| PA-1 | PET stretch temp., 90° C. | 2.1/3 times | ABS | 8.2 | 4 | 3.9 |
| PA-2 | PET stretch temp., 90° C. | 2.1/3 times | ABS | 8.2 | 25 | 3.9 |

| Sample symbol | Evaluation Thickness deviation at ends of main | Determined to be | Remarks Ex. or Comp. Ex. |
|---|---|---|---|
| AP-9 | 4(*3) | ◉ | Example |
| AP-10 | 2 | ◉ | Example |

TABLE 3-continued

| | | | |
|---|---|---|---|
| AP-11 | 3 | ⊚ | Example |
| AP-12 | broken[*4] | X | Comp. Ex. |
| PP-1 | 3 | ⊚ | Example |
| PA-1 | 13 | X | Comp. Ex. |
| PA-2 | 4 | ⊚ | Example |

Note
Unit of stretch stress values (T, t): MPa
[*1]Blending ratio of PC + ABS = 1:1.
[*2]Both-end films only were locally heated at 160° C. (stretch stress was measured at 160° C.).
[*3]Thickness at the central portion of the film after stretched, 100 μm.
[*4]Broken due to split near the boundary of main film and both-end films.

Table 3 shows the measured and evaluated results of thickness deviation % at a position 30 mm away from an end of the main film that is stretched to 2 times or 3 times in combination with the both-end films. The thickness deviation % in Table is a percentage ratio of a thickness deviation between the central position of the main film and the position 30 mm away from the end of the main film to the thickness of the central portion. The smaller the thickness deviation %, the more uniform the thickness profile of the main film in the direction of width, contributing to improving performance, particularly, as a film for optical use and improving the yield of production.

At the position 30 mm away from the end of the main film, the thickness deviation % of not larger than 7% relative to the central portion was determined in the column of evaluation to be acceptable (a range in excess of 5% but not larger than 7% was represented by a symbol ○ and, particularly, not larger than 5% was represented by a symbol ⊚). The thickness deviation in excess of 7% or the film that has broken was represented by a symbol X.

Figure 6:
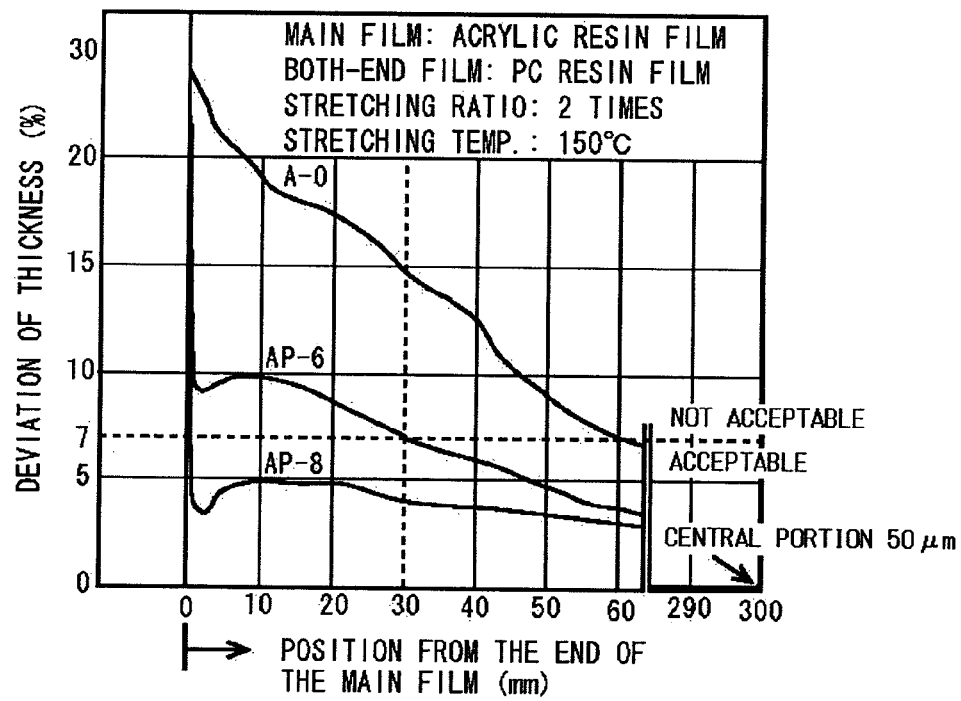
FIG. 6 is a graph showing deviation (%) in the thickness of the main film in the direction of width in the embodiment of the invention.

FIG. 6 shows thickness profiles in the direction of thickness of the sample symbols A-0 (main film of acrylic resin was stretched without arranging films along both end sides thereof), AP-6 (main film of acrylic resin and both-end films of PC resin having a width of 5 mm) and AP-8 (main film of acrylic resin and both-end films of PC resin having a width of 25 mm) shown in Table 3. With the sample symbol A-0 having no both-end films arranged along both end portions of the main film, the thickness deviation was as great as 28% near the extreme end portions and decreased from the end portions toward the center, but was still 15% at a position 30 mm away from the end. With the samples symbols AP-6 and AP-8 having both end films of 5 mm and 25 mm arranged along both end portions of the main film, on the other hand, the thickness deviation was improved to not larger than 7% at the position 30 mm away from the end. This was because the both-end films having a large stretch stress value restricted both end portions of the main film having a small stretch stress value and suppressed the deformation due to the shrinkage of width (the width shrinks and the thickness increases correspondingly).

With the samples symbols AP-1 and AP-2 having polyethylene naphthalate (PEN) films arranged along both ends of the main film shown in Table 3, the stretch stress ratios between the two were 1.06 and 1.1, respectively, and the thickness deviations were 12% and 10%. The sample symbol AP-3 was the one in which polyarylate A films were arranged in parallel along both ends of the main film and the stretch stress ratio was increased to 1.5. In this case, the thickness deviation was as good as 6%. Therefore, the lower limit of the stretch stress ratio for improving the thickness deviation was set to be 1.5.

With the sample symbol AP-11 (stretch stress ratio of 5.3) and the sample symbol PP-11 (stretch stress ratio of 6.9) having increased stretch stress ratios, wrinkles occurred to slight allowable degrees while the thickness deviation was improved to 3%. With the sample symbol AP-12 having a further increased stretch stress ratio (stretch stress ratio of 10.6), however, breakage occurred near the boundary between the main film and the both-end films.

As described above, wrinkles tend to develop as the stretch stress ratio increases and breakage results if the stretch stress ratio becomes excessively high. According to the present invention, therefore, the upper limit value of the stretch stress ratio is set to be 6.9 at which wrinkles occur to a slight allowable degree. When the polyarylate resin A, a blended resin (PC+ABS) of the PC resin and the ABS resin, the PC resin or the ABS resin is used as the both-end films for the main film of acrylic resin, PMMA resin or PET resin, too, as shown in Table 3, it is made possible to greatly improve the thickness deviation by setting the stretch stress ratio between the two to lie in a range of 1.5 to 6.9.

In the sample symbol PA-1, the both end films arranged along both end portions of the main film possessed a width of 4 mm (on each side). In this case, though the stretch stress ratio was 3.9 lying within the range specified by the invention, the thickness deviation was 13% greatly deviating from the target value of 7%. Upon setting the stretch stress ratio to be 3.2 and the width of the both-end films to be 5 mm as in the case of the sample symbol AP-4, however, the thickness deviation was improved to 7%. Since the thickness deviation can be greatly improved by setting the width of the both-end films to 5 mm, the lower limit of the width of the both-end films arranged in parallel is set to be 5 mm.

With the sample symbol AP-10, further, the both-end films possessed a width of as large as 50 mm, and the thickness deviation was improved to 2% at a position 30 mm away from the end of the main film. Thus, the thickness deviation improves with an increase in the width of the both-end films accompanied, however, by an increase in the areas of the both-end films that must be cut and removed after arranged in parallel and, therefore, by an increase in the cost.

The sample symbols AP-6 to AP-10 were those in which the main film was stretched at a temperature of 150° C. while the both-end films only were locally heated and stretched at 160° C. As represented by the sample symbol AP-11, the PC resin film exhibited a stretch stress value of 9.0 MPa when it was stretched into 2 times at a temperature of 150° C. Under a condition of locally heating at a temperature of 160° C. as shown in Table 1, however, the PC resin film forming the both-end films exhibited a stretch stress ratio that was slightly decreased to 8.0 MPa. Therefore, the stretch stress ratio can be calculated to be 4.7. As described above, the stretch stress ratio relative to the main film can be maintained to lie in the range specified by the invention even by varying the stretch stress value by elevating the temperature at both end portions only at the time of stretching, and the thickness deviation can be decreased.

The sample symbol AP-9 was the one obtained by melt-coextruding the main film and the both-end film so as to possess a film thickness of 200 μm and stretching the film into 2 times so as to possess a thickness of 100 μm. The thickness deviation to the main film was 4% which was of the same level as the sample symbol AP-8 which possessed a thickness of 50 μm after stretched.

In the foregoing were described the results of the monoaxially stretched films with reference to Table 3. According to the production method of the present invention, however, improvement in the thickness deviation at the ends of the main film attained by the monoaxial stretching is maintained even after biaxially stretched. Here, as the method of biaxially stretching the film, there can be applied a sequential stretching method of effecting the stretching in the lengthwise direction and, thereafter, effecting the stretching in the direction of width, or a simultaneous stretching method of effecting the stretching in the lengthwise direction and in the direction of width simultaneously.

INDUSTRIAL APPLICABILITY

According to the method of producing a stretched film of thermoplastic resins, the film is produced by melt-coextruding a main film and another both-end films along both end portions of the main film in the direction of width, the both-end films having a film stretch stress value larger than that of the main film measured at the same stretching ratio, followed by stretching. Therefore, the main film is restricted at its both ends, suppressed from deforming in the directions of width and thickness, and has an increased region where the thickness remains uniform in the direction of width of the main film. The production method of the present invention makes it possible to produce a film having an increased width. The invention greatly contributes to decreasing the cost of producing optical films used for liquid crystal display devices under the circumstances where the cost of producing functional films is increasing, since the invention makes it possible to produce a film having a small deviation of thickness in the direction of width maintaining good yields.

The invention claimed is:

1. A method of producing a stretched film comprising:
   melt-coextruding a thermoplastic resin A and a thermoplastic resin B to produce a composite film having both-end films of the thermoplastic resin B arranged in parallel at both end portions of the main film of the thermoplastic resin A in the direction of width thereof;
   stretching said composite film in the direction in which said both-end films of said main film are arranged;
   cutting portions of said composite film other than a portion of the main film having an allowable thickness; and
   removing the cut portions, which include the both-end films and a portion of the main film other than the portion of the main film having an allowable thickness;
   wherein a film stretch stress value of said both-end films is 1.5 to 6.9 times as great as a film stretch stress value of the main film at the same stretching ratio; and
   the width of said both-end films is not smaller than 5 mm on each side before being stretched.

2. The method of producing a stretched film according to claim 1, wherein said stretching is a monoaxial stretching or a biaxial stretching.

* * * * *